UNITED STATES PATENT OFFICE.

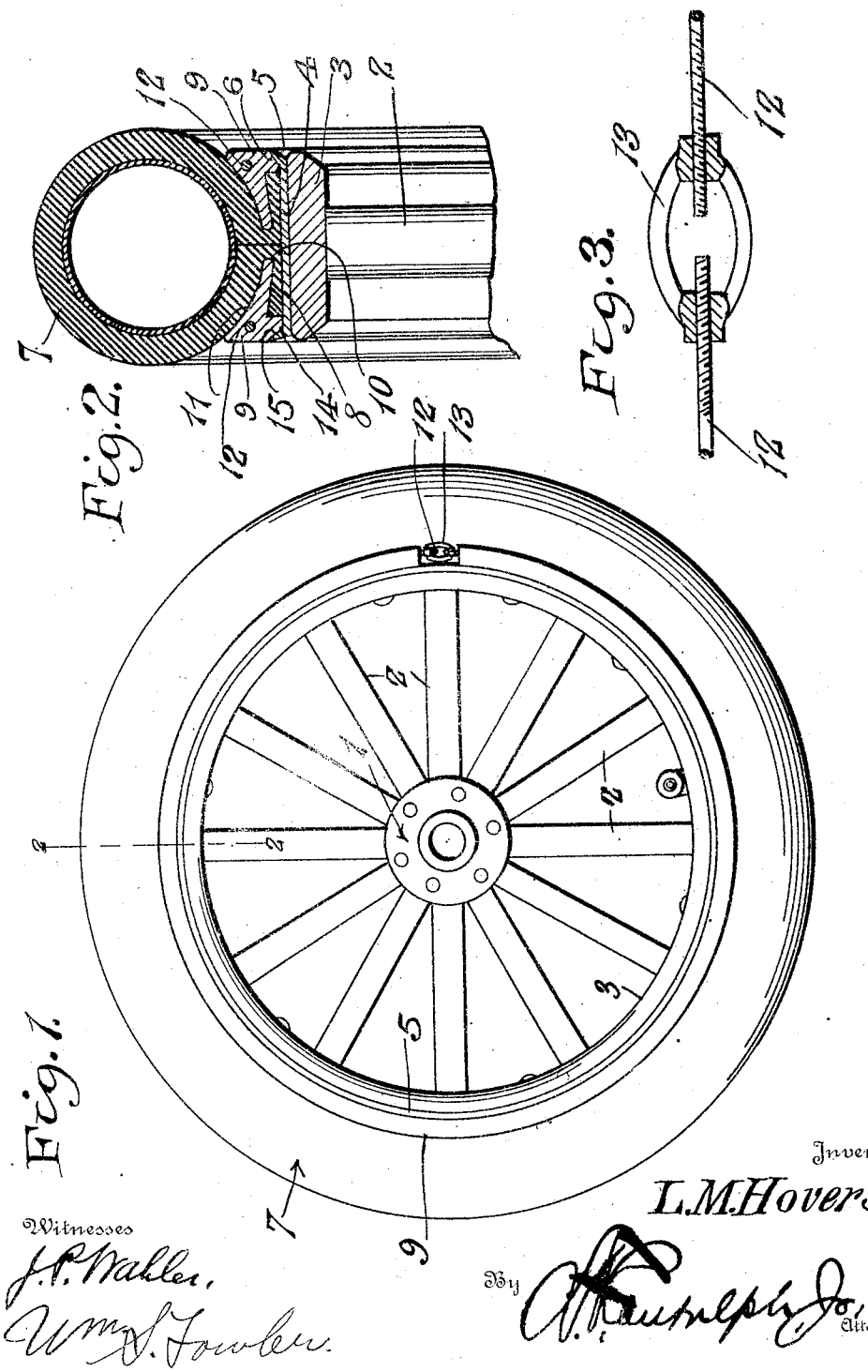

LOUIS M. HOVERSON, OF BRANDON, SOUTH DAKOTA.

DEMOUNTABLE RIM.

1,113,899.  Specification of Letters Patent.  Patented Oct. 13, 1914.

Application filed May 23, 1914. Serial No. 840,612.

*To all whom it may concern:*

Be it known that I, LOUIS M. HOVERSON, a citizen of the United States, residing at Brandon, in the county of Minnehaha and State of South Dakota, have invented certain new and useful Improvements in Demountable Rims, of which the following is a specification.

This invention comprehends certain new and useful improvements in demountable rims and has for its primary object to provide a device of this character which will be of extremely simple construction and will be formed in such manner that the parts may be readily secured in proper position to support a tire upon the rim of a wheel upon which this demountable rim is employed.

A further object of the invention is to provide a demountable rim which will be constructed in such manner that the side flanges will serve to support the tire in proper position and clamp the same upon the rim positioned upon the felly of the wheel.

A further object of the invention is to provide improved and novel side flanges having locking ribs for engagement with the side locking edges of the ribs extending outwardly from the same, whereby the side flanges will be prevented from moving out of position after the turnbuckles, employed for connecting the opposite ends of said flanges, have been tightened.

This invention has for a further object to generally improve and simplify the construction and operation of devices of this character and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a side elevation of a wheel, employing my improved form of demountable rim, Fig. 2 is an enlarged detail section on the line 2—2 of Fig. 1, and Fig. 3 is a detail sectional view through one of the turn-buckles and rods connected by the same for tightening the removable side flanges.

Referring in detail to the drawings by numerals, 1 designates the hub, 2 the spokes, and 3 the felly of a wheel upon which I have shown positioned my improved demountable rim comprising principally a removable rim or plate 4 formed of a suitable sheet metal and having the opposite edges directed outwardly to form locking flanges 5 having their inner edges 6 beveled, the purpose of which will presently appear.

A suitable tire 7 may be positioned upon the rim 4 with the flanges 8 of said tire projecting outwardly. The tire 7 is secured in position by means of the removable side flanges 9 having inwardly directed portions 10 for engagement between the flanges 8 and the main portion of the tire 7, the upper faces 11 of said inwardly directed portions 10 being concaved to correspond to the curvature of the tire 7 and to form suitable supports for the same. The side flanges 9, as will be readily understood, are in the form of transversely split rings and have the rods 12 extended through the same to reinforce said side flanges and also serve as connecting means for the ends of said side flanges, the extremities of said rods 12 being projected beyond the ends of the flanges and threaded to receive the turn-buckles 13, which serve to draw together the ends of said side flanges 9 and securely fasten said side flanges against movement upon the wheel rim 4. The side flanges 9 also have locking ribs 14 projecting laterally from their inner faces and adapted for engagement with the locking flanges 5 of the rim 4 to prevent outward movement of said side flanges 9. The outer edges 15 of the locking ribs 14 are beveled to correspond with the inner edges 6 of the locking flanges 5, whereby said side flanges 9 will be forced inwardly as the ends of said side flanges are drawn together. It will also be seen that by providing the locking flanges 5 and the locking ribs 14 with the opposed inclined faces, the side flanges 9 will be caused to securely clamp the tire 7 in position upon the rim 4 and it will further be readily seen that outward movement of the flanges 8 of the tire 7 will be prevented by the locking ribs 14 which are positioned between the ends of said flanges 8 and the locking flanges 5.

Further, it will be evident that after the turn-buckles 13 have been tightened, it will be impossible for the side flanges 9 to work out of position until the turn-buckles 13 are again loosened.

While I have shown and described the preferred embodiment of my invention, it will be understood that minor changes in the details of construction, combination and arrangement of parts may be made without departing from the spirit and scope of the invention as claimed, or sacrificing any of the advantages thereof.

What is claimed is:—

1. A device of the class described comprising the combination with a flanged tire and felly; of a rim positioned upon said felly, removable side flanges having portions engaged against the outer faces of the flanges of the tire to force the latter against the rim, locking flanges carried by said rim, locking ribs carried by said removable side flanges and engaged with said locking flanges to prevent outward movement of said side flanges, said removable side flanges being in the form of transversely split rings, and means for drawing the opposite ends of each flange toward one another to clamp said side flanges against movement.

2. A device of the class described comprising the combination with a felly, a rim positioned upon said felly, and a tire positioned upon said rim; of removable side flanges having inwardly directed portions for engagement between the main portions of the tire and the outwardly directed flanges thereof to force said outwardly directed flanges against the rim, the outer faces of said inwardly directed portions being concave to conform to the curvature of the main portion of the tire, means for tightening the side flanges and preventing movement thereof independently of the tire and rim, and means carried by said side flanges and said rim to prevent outward movement of said side flanges.

3. A device of the class described comprising the combination with a tire, rim and felly; of removable side flanges positioned upon said rim, the flanges of said tire being engaged upon said rim, said side flanges having inwardly directed portions for engagement with the outer faces of the flanges of said tire to press said tire flanges against the rim, said rim having locking flanges formed along its opposite edges with inclined inner faces, said side flanges being provided with locking ribs having inclined faces for engagement with the inclined faces of said locking flanges to prevent outward movement of said side flanges, said removable side flanges being transversely split, and means for drawing together the opposite ends of said side flanges to clamp the latter upon the rim.

In testimony whereof I affix my signature in presence of two witnesses.

LOUIS M. HOVERSON.

Witnesses:
E. O. SEVERSON,
M. A. KEPPLE.